W. R. REDDING.
Stove-Door Handle.
No. 87,969. Patented March 16, 1869.
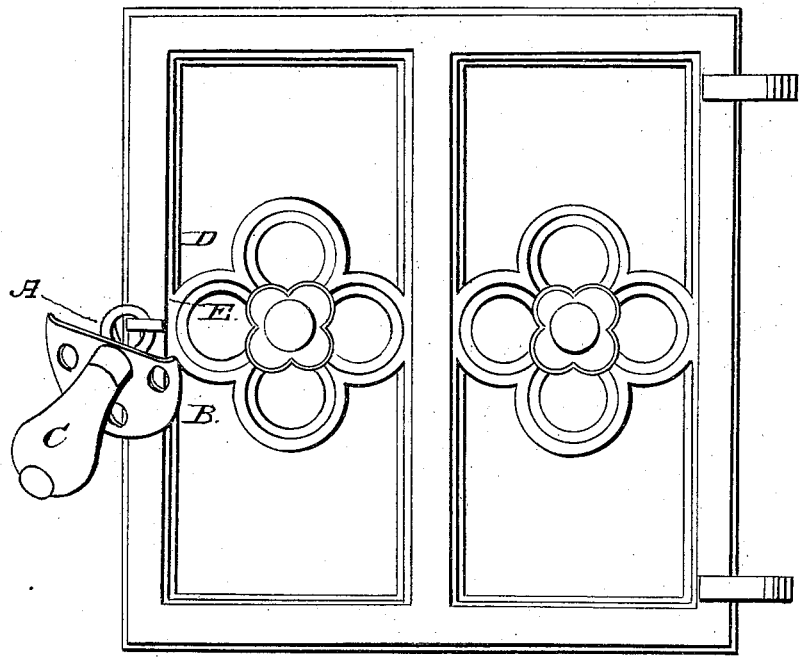

WILLIAM F. REDDING, OF SARATOGA SPRINGS, NEW YORK.

Letters Patent No. 87,969, dated March 16, 1869.

IMPROVEMENT IN STOVE-DOOR HANDLES.

The Schedule referred to in these Letters Patent and making part of the same.

*To all whom it may concern:*

Be it known that I, WILLIAM F. REDDING, of Saratoga Springs, in the county of Saratoga, and State of New York, have invented certain new and useful Improvements in Stove-Door Handles; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention relates to stove-door handles, and consists in certain new and useful improvements in the manner of constructing handles for stove-doors, for which Letters Patent, No. 84,966, were granted to me, dated December 15, 1868.

In the drawings—

Figure 1 is a perspective view of my handle attached to a stove-door, and

Figures 2 and 3 are longitudinal sections of modifications in the manner of fastening the eye.

The object of my handle is the same as stated in said Letters Patent, above mentioned, that is, to furnish a cheap and convenient device for opening stove-doors, without danger of burning the hand, and which will be always ready for use.

In constructing my handle, I take a piece of wire, of any suitable length, and form an eye, A, on one end, and pass the other end through a semicircular piece of flat metal, B, and then through a handle, C, made of wood, or other suitable non-conducting material, and fasten it by riveting down the end, or by wedging it fast, or in any other manner that will securely hold it in place.

When thus constructed, I attach it to the stove-door D, by connecting the eye A to an eye, E, on the door, as shown in fig. 1.

The metal plate B serves as a fender, and holds the handle C away from the stove, so that it can easily and conveniently be taken hold of by the operator.

This metal fender B may be perforated, and have its edge curved slightly, as shown, and may be more or less than a semicircle, as desired, its function being to hold the handle away from the stove, and any form that will secure that result, it is obvious, may be used.

Instead of having the shank of the eye riveted down, or fastened, with a pin passing through it, to the wooden or other handle, C, I sometimes split the end of the shank F, and drive in the end of the handle a broad-headed brad, $a$, as shown in fig. 2. This fastening will hold all the parts securely together.

When the fender is composed of wire, as described in my patent of December 15, 1868, above mentioned, it may consist of a separate piece from that forming the eye. In that case, I pass both the shank of the eye and of the fender together through the handle C, and fasten them by driving a broad-headed brad, $a$, between their ends, as shown in fig. 3; my object in these different methods of fastening being to secure the parts together in a simple and strong manner.

Having thus described my invention,

What I claim, is—

A stove-door handle, consisting of an eye, A, fender B, and handle C, or their equivalents, constructed and united substantially as herein described.

WILLIAM F. REDDING.

Witnesses:
 JNO. C. HULBUT,
 J. S. LEAKE.